US009024545B2

(12) United States Patent
Bloch et al.

(10) Patent No.: US 9,024,545 B2
(45) Date of Patent: May 5, 2015

(54) METHOD AND APPARATUS FOR A GEOGRAPHICALLY DETERMINED JEWISH RELIGIOUS CLOCK AND ELECTRICAL DEVICE COMBINATION WITH HOLIDAY AND PREFERENCE MODES

(75) Inventors: Yonason Bloch, Lakewood, NJ (US); Herbert Klein, Lakewood, NJ (US)

(73) Assignee: United Electric Systems Corp., Clifton, NJ (US)

( * ) Notice: Subject to any disclaimer, the term of this patent is extended or adjusted under 35 U.S.C. 154(b) by 672 days.

(21) Appl. No.: 13/409,774

(22) Filed: Mar. 1, 2012

(65) Prior Publication Data

US 2012/0223661 A1    Sep. 6, 2012

Related U.S. Application Data

(60) Provisional application No. 61/449,031, filed on Mar. 3, 2011.

(51) Int. Cl.
*H05B 37/02*    (2006.01)
*H05B 39/04*    (2006.01)
*H05B 41/36*    (2006.01)

(52) U.S. Cl.
CPC ............. *H05B 37/0281* (2013.01); *Y02B 20/42* (2013.01); *Y02B 20/40* (2013.01)

(58) Field of Classification Search
USPC .......................................... 315/209–226, 360
See application file for complete search history.

(56) References Cited

U.S. PATENT DOCUMENTS

| | | |
|---|---|---|
| 3,980,980 A | 9/1976 | Zioni et al. |
| 4,031,435 A | 6/1977 | Zioni et al. |
| 4,375,583 A | 3/1983 | Halperin et al. |
| 4,506,120 A | 3/1985 | Fleischman |
| 5,086,385 A | 2/1992 | Launey et al. |
| 5,808,278 A | 9/1998 | Moon et al. |
| 5,902,352 A | 5/1999 | Chou et al. |
| 6,011,755 A | 1/2000 | Mulhall et al. |
| 6,066,837 A | 5/2000 | McCormick et al. |
| 6,473,661 B1 * | 10/2002 | Wollner .......................... 700/83 |
| 6,703,591 B2 | 3/2004 | Daum et al. |
| 6,965,801 B2 * | 11/2005 | Hall ................................ 700/66 |

(Continued)

OTHER PUBLICATIONS

International Search Report received in corresponding PCT/US2012/027243 dated Jun. 20, 2012.

*Primary Examiner* — Brandon S Cole
(74) *Attorney, Agent, or Firm* — Edell, Shapiro & Finnan, LLC

(57) ABSTRACT

An independently functioning or centrally controlled wall light switch is configured to operate in normal mode and a Jewish holiday mode wherein the state of the light is fixed, regardless of the user's physical manipulation of the light switch. The control system automatically activates holiday mode by combining a geographically determined Jewish religious clock executed by software and hardware that utilizes the current time, date and geographical location of the apparatus in accordance with the Jewish definition of time and laws for calculating numerous religiously significant shifting daily points in time. The control system further incorporates several energy saving and preference modes by utilizing a particular day's calculated religious points in time in conjunction with holiday behavior patterns common to most Jewish families to provide the user with a greatly simplified means of programming an automatically adjusting on/off light timer and dimming overlay functionality during holiday mode.

35 Claims, 9 Drawing Sheets

(56) References Cited

U.S. PATENT DOCUMENTS

| | | |
|---|---|---|
| 7,310,559 B2 | 12/2007 | Walko, Jr. |
| 7,386,424 B2 | 6/2008 | DeBoer et al. |
| 7,872,576 B2 | 1/2011 | Kalatizadeh |
| 7,970,264 B2 | 6/2011 | Grossbach et al. |
| 8,067,706 B2 | 11/2011 | Tukachinsky |
| 8,390,204 B1 * | 3/2013 | Zagha ............ 315/153 |
| 2005/0133353 A1 | 6/2005 | Whitman |
| 2006/0074497 A1 | 4/2006 | Pollin |
| 2007/0261561 A1 | 11/2007 | Grossbach et al. |
| 2009/0167098 A1 * | 7/2009 | Kalatizadeh ............ 307/116 |
| 2009/0218957 A1 * | 9/2009 | Kraft et al. ............ 315/291 |
| 2009/0254831 A1 * | 10/2009 | Dolny et al. ............ 715/733 |
| 2010/0084996 A1 * | 4/2010 | Van De Sluis et al. ....... 315/312 |
| 2011/0014932 A1 | 1/2011 | Estevez |
| 2011/0170379 A1 | 7/2011 | Eylon-Azoulay |

* cited by examiner

FIG. 1 External View of Installed Light Switch
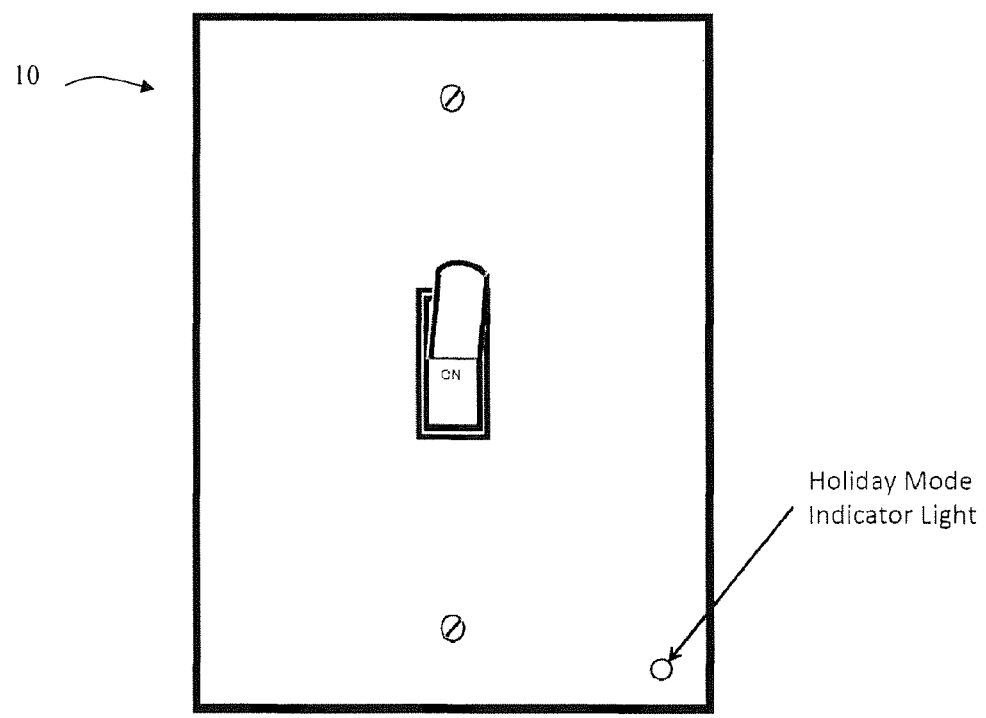

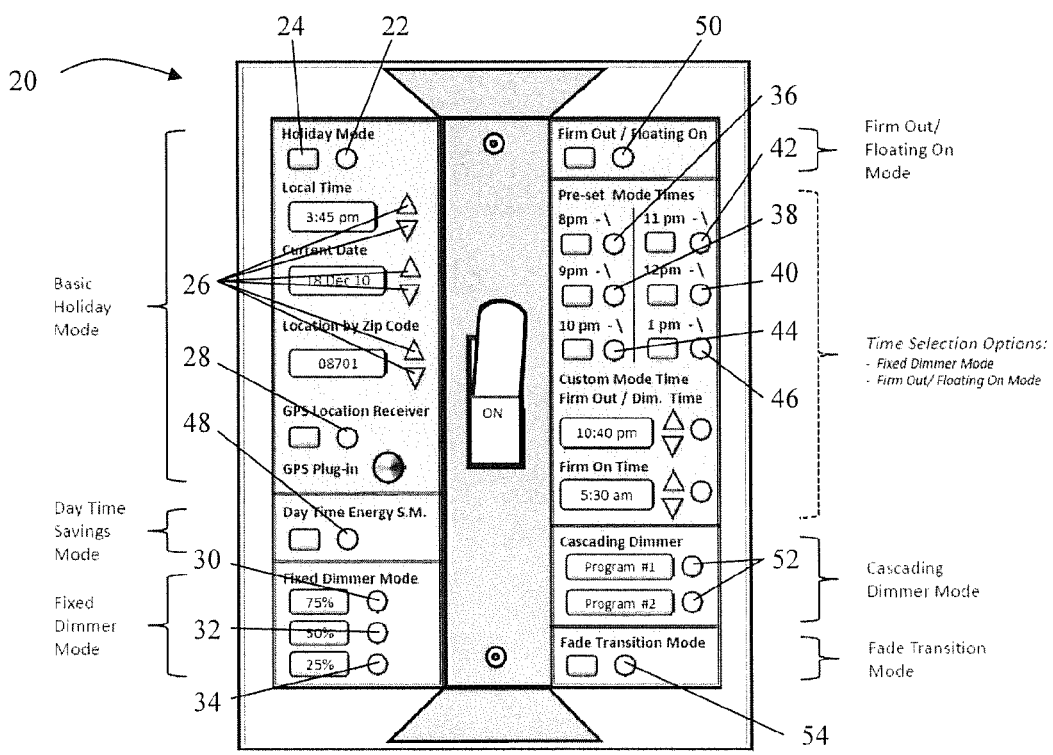
FIG. 2 Concealed Internal View of the Light Switch

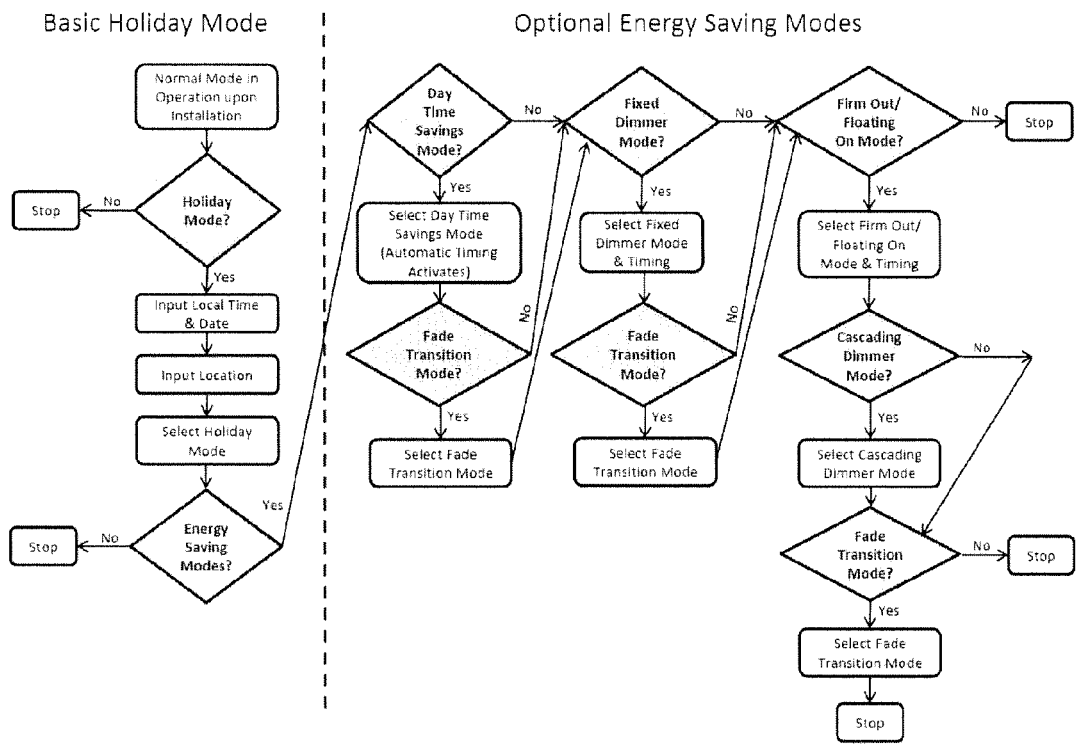
FIG. 3 Mode Selection Process Flowchart

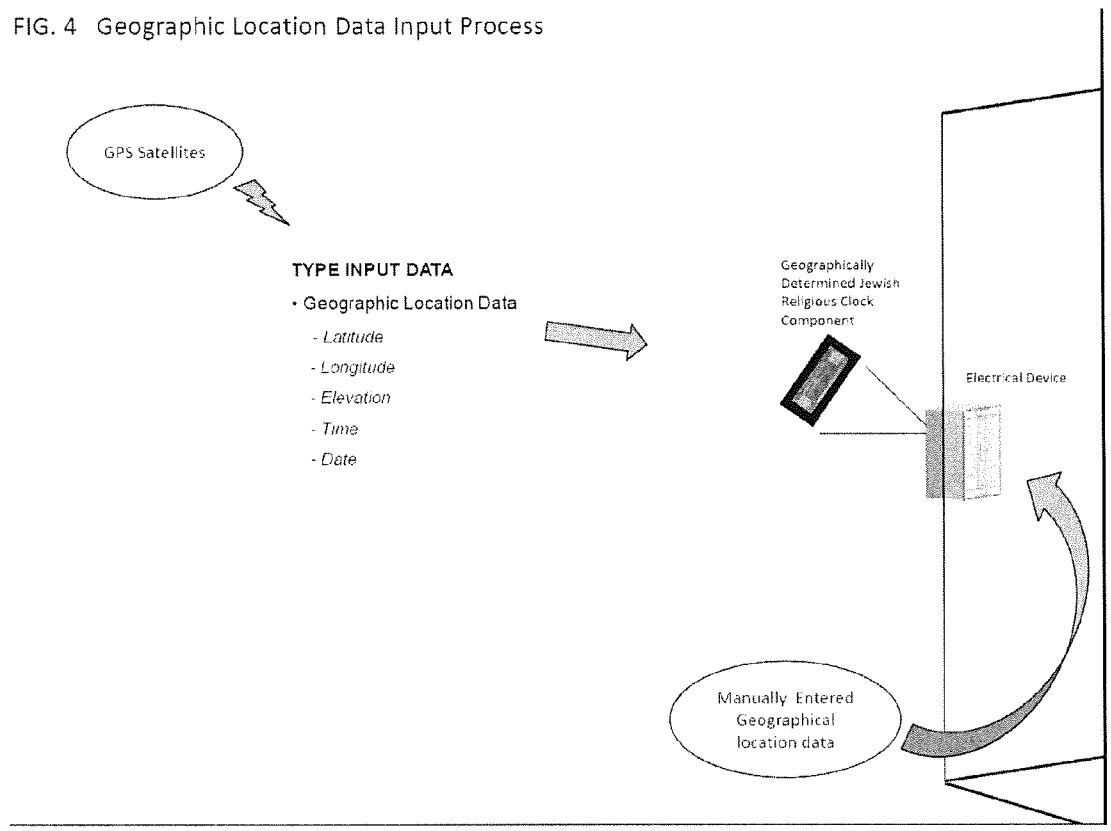
FIG. 4  Geographic Location Data Input Process

FIG. 5 Optional, Single Flush, Subdued Push Button For Emergency Activation
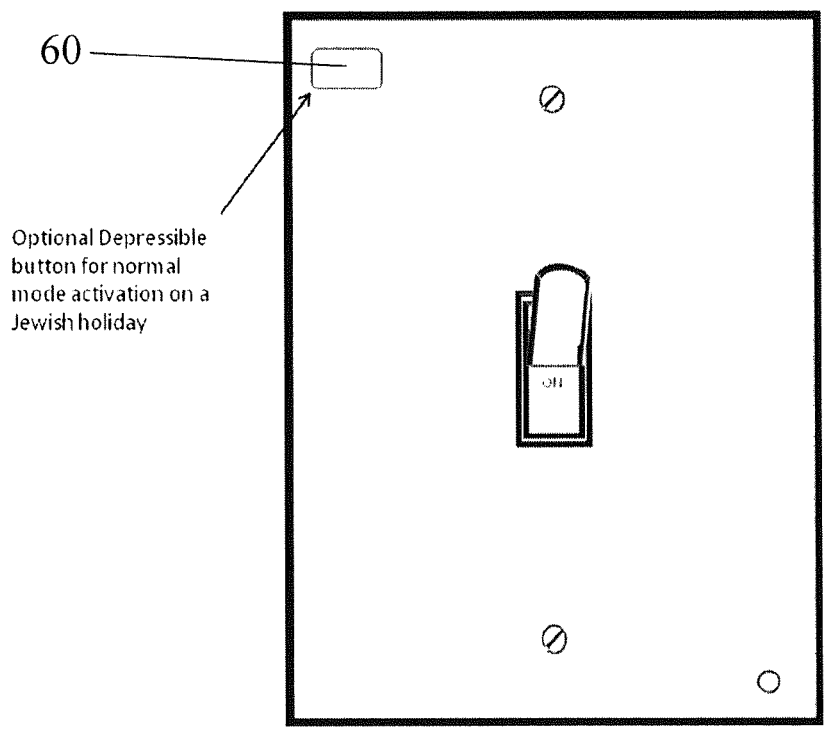
60
Optional Depressible button for normal mode activation on a Jewish holiday

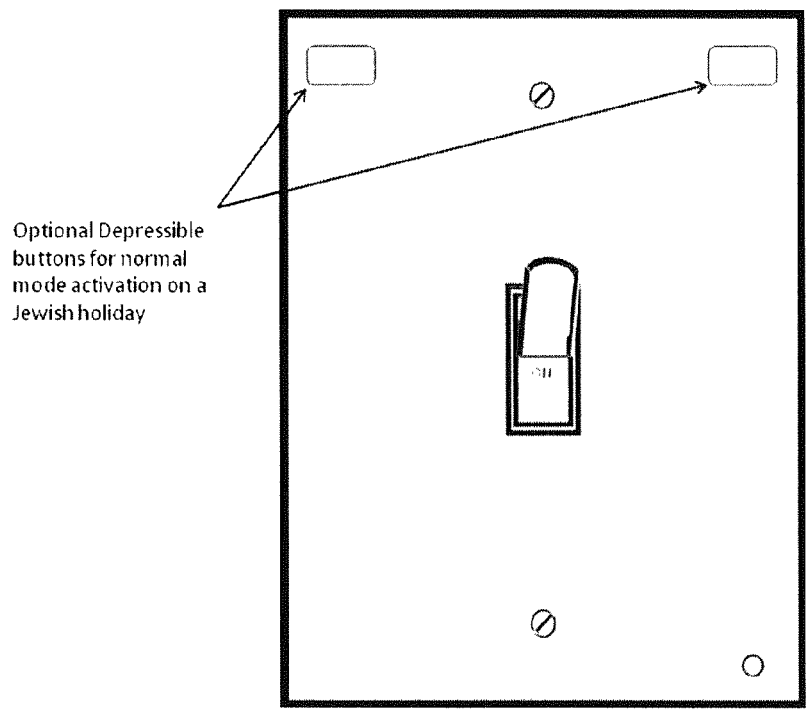
FIG. 6 Optional, Two Flush, Subdued Combination Push Buttons For Emergency Activation
Optional Depressible buttons for normal mode activation on a Jewish holiday

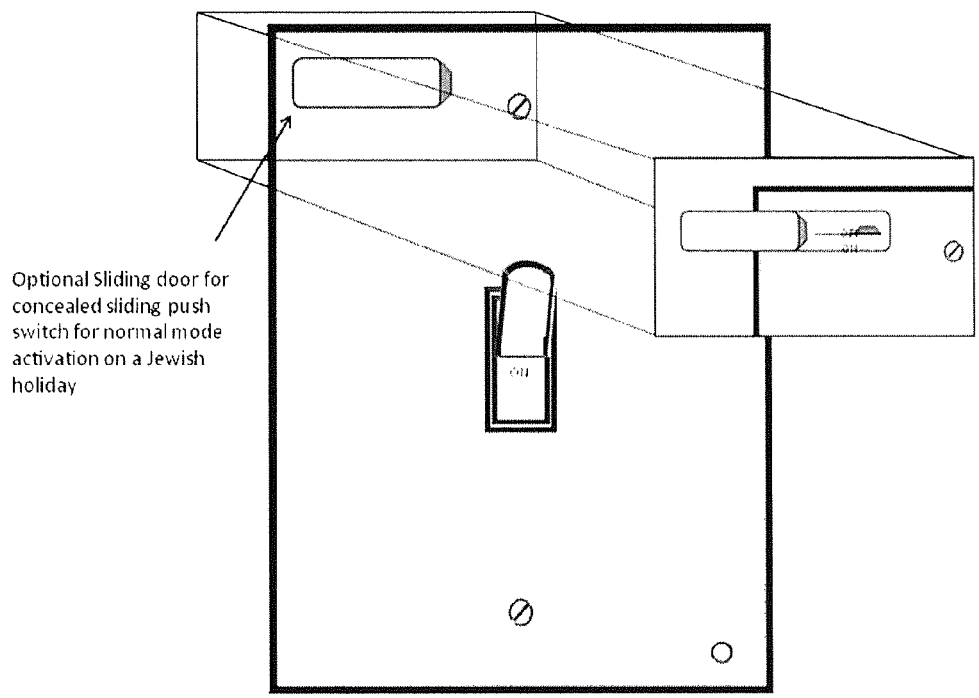
FIG. 7 Optional, Sliding Door for Concealed Sliding Switch for Emergency Activation
Optional Sliding door for concealed sliding push switch for normal mode activation on a Jewish holiday

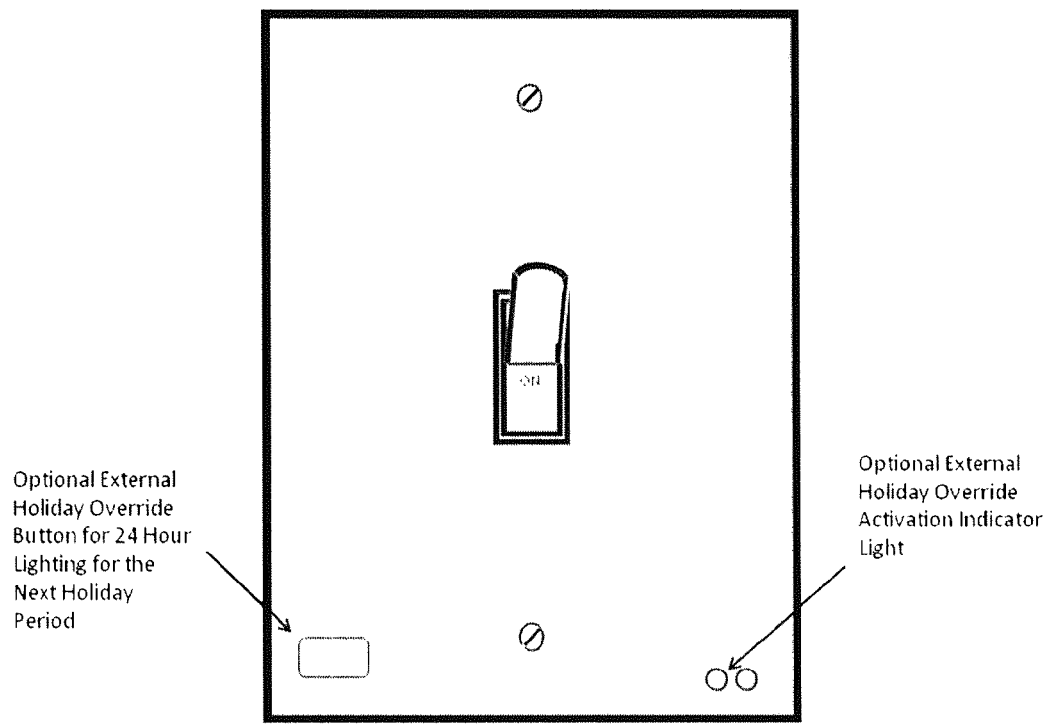
FIG. 8 Optional, Flush, Subdued External Holiday Override Button

FIG. 9 Removable Externally Mounted Wall Unit that is Wireless Capable
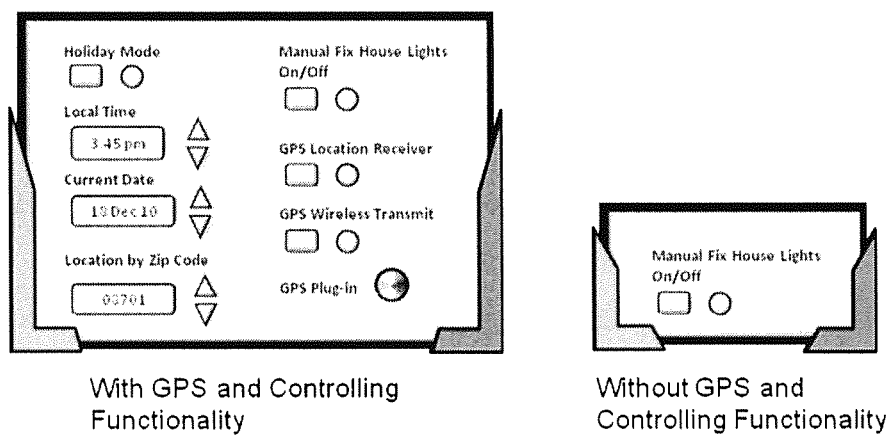
With GPS and Controlling Functionality
Without GPS and Controlling Functionality

METHOD AND APPARATUS FOR A GEOGRAPHICALLY DETERMINED JEWISH RELIGIOUS CLOCK AND ELECTRICAL DEVICE COMBINATION WITH HOLIDAY AND PREFERENCE MODES

RELATED APPLICATION

This application claims the benefit of the filing date of U.S. Provisional Patent Application No. 61/449,031, filed Mar. 3, 2011. Said application is hereby incorporated by reference in its entirety.

FIELD

The disclosed subject matter relates to a method and apparatus for controlling electronic circuitry using a clock and electrical device combination with holiday and preference modes. Particularly, the present disclosed subject matter is directed to a method and apparatus for enabling Jewish people to control building and household lighting during religious holidays.

BACKGROUND

Jewish people are commanded under Jewish law to refrain from 39 categories of labor on the Sabbath, holidays, and festivals, i.e., Jewish events. These rules, the timing of the holidays, and the rules governing the interplay there between may be found in the Jewish Law, or Halakhah. The Halakhah includes the Tanakh (i.e., Torah, Nevi'im, and Ktuvim) and Talmudic Literature (which includes the Mishnah, Tosefta, Jerusalem Talmud and Babylonian Talmud), each of which are herein incorporated by reference. Flipping on or off a common wall light switch constitutes a prohibited act under the category of lighting and extinguishing a fire. Therefore, Jewish people take extreme care not to accidentally change the state of a light by inadvertently bumping the switch. In addition, there is a concern where small children or non-Jewish people change the desired state of the light during a holiday unaware that a Jewish person cannot return the light to its previous state or request another person to do so.

Jewish people go to great lengths in order to prevent or at least mitigate these concerns by painstakingly taping down numerous light switches just prior to a holiday. An alternate solution offered by the current state of the art is an external magnetic light switch cover that is manually positioned over the switch face plate to create a physical barrier to the on/off switch.

Since securing the state of the lights is usually one of the last tasks completed just moments before the start of a holiday, these time-consuming methods produce stress as the person searches for the tape or switch covers and rushes to physically secure the light switch from manipulation during the holiday.

Further, because Jewish people are not allowed to change the state of the lights when not being used during the Sabbath an enormous amount of energy and money is wasted. Sometimes the weekly Sabbath and other Jewish holidays occur in conjunction with each other, leaving numerous lights on for up to 3 days.

SUMMARY

This summary and the accompanying abstract are partial and for convenience only.

In one aspect, the apparatus and methods described herein provide means for obtaining date, time and geographic location data and combining it with electronic and/or mechanical devices to enable a control system to operate the apparatus in accordance with Jewish law by utilizing the resulting religious reference times that are calculated from the sun's and moon's relationship to the device's specific geographic location.

In one embodiment of such an apparatus, an electrical switch provides a means of selecting between a normal mode and a holiday mode. If the holiday mode is activated, the control system overrides normal mode functionality. At the onset of the holiday period the control system fixes the state of the switch in its current on/off state, maintaining that state regardless of the user's physical manipulation of the light switch. In another aspect, the ability to select modes is provided by means of a button to activate a control system for automatically initiating the holiday mode at the beginning of a Jewish holiday and for automatically deactivating the holiday mode at the end of a Jewish holiday.

In a further aspect, techniques may be employed to store a holiday calendar and detect local date, time, and daylight conditions within the apparatus, to facilitate the above functions.

Other aspects and advantages of the disclosure will be apparent to those skilled in the art on reviewing the drawings referenced below and reading the following detailed description.

BRIEF DESCRIPTION OF THE DRAWINGS

Reference is made to the accompanying drawings, in which:

FIG. 1 illustrates the external view of the installed light switch.

FIG. 2 illustrates the concealed internal view of the light switch.

FIG. 3 illustrates a mode selection process flowchart.

FIG. 4 illustrates the geographical location data input process.

FIG. 5 illustrates the Optional Single Push Emergency Activation Button.

FIG. 6 illustrates the Optional Combination 2 Push Button Emergency Activation.

FIG. 7 illustrates the Optional Sliding Door for Concealed Switch for Emergency Activation.

FIG. 8 illustrates the Optional External Holiday Override Button for 24 Hour Lighting.

FIG. 9 illustrates the Optional Removable Externally Mounted Wall Unit that is Wireless Capable.

The drawings are provided to illustrate the exemplary embodiments selected for discussion in the following detailed description. Thus, the particular features shown in the drawings should not be understood to limit the scope of the invention.

DETAILED DESCRIPTION

The following is a detailed description of exemplary embodiments such as those illustrated in the accompanying drawings. The invention should not be understood as limited to the specific embodiments described below. The appended claims should be consulted in order to appreciate the scope of the invention.

Referring to FIG. 1, in one embodiment, a wall light switch may have particular utility for Jewish people by providing an article 10 that maintains the traditional look and feel of a typical light switch, while concealing a panel 20 of new functionalities that result in an independently functioning light switch capable of operating in normal mode and Jewish holiday mode as depicted in FIG. 2. While the preferred embodiment is presented to the user in a traditional format an external digital user interface screen could be employed. In addition, the new apparatus includes energy saving and preference modes that significantly reduces the homeowner's energy bill while enhancing the holiday experience. By default the wall light switch will operate in normal mode, defined as typical light switch operation commonly in use today. If holiday mode is activated, the control system overrides normal mode functionality. At the onset of the holiday period the control system fixes the state of the lights in its current on/off state, maintaining that state regardless of the user's physical manipulation of the light switch.

In a further embodiment, holiday mode may be activated by pressing a single activation button 22 as depicted in FIG. 2. After depressing the holiday mode selection button, an adjacent green indicator light 24 turns on to indicate activation of holiday mode. For holiday mode to function in this embodiment, the user must first ensure that the current time, date and geographical location of the device is input into the apparatus. If the holiday mode selection button is pressed prior to this information being input into the device, the holiday mode indicator light will flash, indicating that additional data is required by the control system to allow for proper calculation and application of holiday mode functionality. Once fully activated, holiday mode indefinitely applies the fixing and unfixing of the state of the lights as each successive holiday arrives and leaves.

In such an embodiment, the control system executes this functionality by utilizing software that equates to a digital clock that continuously calculates religiously significant events such as a sunset at the beginning of a holiday and a sunrise during the holiday based on the sun and moon's changing relationship to the apparatus' specific global geographic location in accordance with Jewish law. The control system in such an embodiment may comprise a microprocessor, software capable of executing mathematical computations, non-volatile memory and a backup battery to provide for the automatic restart of controlling modes after a power failure. In some embodiments, the switch is designed to only require the user to input the current time, date and geographical location of the device once upon installation or at first use of holiday or preference modes. Alternatively, this information could also be loaded at the place of manufacture or point of sale. The device may further have the capability to maintain and update this data automatically.

To assist user input of the basic reference data required for the apparatus to make necessary time related computations, the device in accordance with some embodiments is designed with both manual and automatic means for data input. In the embodiment illustrated in FIG. 2, the user can manually input the time, date and location by pressing the up/down scrolling arrows 26 to the right of the corresponding data display. Location data is manually entered by the user through selecting the correct zip code, which has associated latitude, longitude and elevation data stored on the apparatus. This method of associating the complicated geographic data elements of latitude, longitude and elevation with a more familiar and succinct geographical data list, provides a greatly simplified means for inputting detailed location data that can be utilized in the mathematical computations for obtaining location dependent religious times based on a combination of the position of both the moon and the sun. Zip codes are but only one such consumer friendly list that lends itself to this type of association. Other lists include but are not limited to cities, counties, bodies of water, landmarks, street addresses, states, area codes, or other geographically related information or reference points.

While the above manual process results in a convenient and precise means for determining geographically dependent religious times, the use of wireless internet, cell phone, tower triangulation technology, or GPS technology to automatically input the three critical data points of date, time, and location, may further simplify an already convenient process, while increasing the accuracy of the religious times to within a space measured in feet from the apparatus' location rather than from the center of a zip code or other reference data point. In the embodiment illustrated in FIG. 2, the data is automatically populated in response to the pressing of a single button 28 on the apparatus under the label GPS Location Receiver and maintaining the device temporarily in a location where GPS signals are received prior to installation. This operation is powered through the use of a power cord or an internal battery. In some embodiments, the system has the capability of obtaining GPS data through the use of a handheld device separate from the apparatus which collects GPS data at a different location and transmits the data to the apparatus either through a wireless or direct plug-in connection to the installed apparatus.

Once the apparatus in such an embodiment has current date, time and location information, the control system may further provide the user with several energy saving and preference modes by utilizing that particular day's calculated religious times in conjunction with holiday behavior patterns common to most Jewish families to avail the user with a greatly simplified means of programming an automatically adjusting on/off light timer and dimming overlay functionality during holiday mode. The control system may automatically execute the additional pre-selected modes during the holiday period when the light switch is left in the on position at the automatic fixing of the light. The additional pre-selected modes may override the fixed state of the light left in the on position. The apparatus may further present energy saving and preference modes, e.g. a fixed dimmer mode and pre-set mode times, through a concise user selection panel. In some embodiments, the modes may be represented by singular push buttons, 30, 32, 34, 36, 38, 40, 42, 44, 46, significantly reducing the complexity of programming the light switch timer and dimming overlay functionality during holiday mode.

Selecting the holiday "Daytime Energy-Savings" mode 48 provided in such an embodiment will automatically turn off the light during daylight hours at a predetermined time in relation to the specific day's calculated time for sunrise and will turn the light back on at a predetermined time in relation to sunset. Further, a selection of several single-push button options for "Firm Out/Floating On" modes 50 may be presented to the user in order to schedule a predetermined shutoff time during holiday evenings that automatically turn the light back on at a predetermined interval before sunrise or sunset. A single-push button option may allow the user to select a custom "Firm Out" time for the "Firm Out/Floating On" mode through a small digital screen with a scrolling time capability for custom time selection. Because the time for sunrise never remains the same and is constantly shifting throughout the year, this unique aspect of such a mode is referred to as the "Floating On" feature.

In addition, a selection of several single-push button options for "Cascading Dimmer" modes 52 may be made available to the user to overlay other holiday modes that will prevent an abrupt light shutoff by "stepping down" the percentage of light over a predetermined length of time. For example, the user may make a selection of an 11:00 p.m. "Firm Out & Floating On" mode overlaid with a 30 minute Cascading Dimmer mode in the dining room to execute an initial 15% diminution of light at 11:00 p.m. for 15 minutes, another reduction in light by 20% ten minutes later, followed by additional 15% reduction for 5 minutes before the light shuts off completely at 11:30. In this scenario the Cascading Dimming mode allows a relaxed transition in dinner conversation for the first 15 minutes, 10 additional minutes for the traditional Jewish blessing for the food and the final 5 minutes to casually exit the dining room area before it completely turns dark.

Further in such an embodiment, a single-push button option may activate the "Fade Transition" mode 54 that reduces or eliminates lighting with a steady fading reduction of light over a short period of time to provide the smoothest transition from one programmed level of lighting to the next, including the state of completely off. The mode can be applied to any and all modes previously described.

FIG. 3 illustrates a mode selection process flowchart. In some embodiments, the system may function in a basic holiday mode that requires input of time, data, and location data. In other embodiments, the system may function in optional energy savings modes.

FIG. 4 illustrates the geographical location data input process using a geographically determined Jewish religious clock component.

In other embodiments, the system may also include a button 60 for emergency activation of normal wall light switch functionality. In some embodiments, this functionality may be provided through the use of a single flush, subdued push button on the face of the light switch cover as shown in FIG. 5. Alternatively, a two button push combination pattern utilizing two flush, subdued push buttons on the face of the light switch cover may be provided as shown in FIG. 6. Alternatively, a sliding door with a hidden push button or sliding activation switch may be provided as shown in FIG. 7. Alternatively, optional emergency activation of normal wall light switch functionality may be achieved through use of a cell phone application, as shown in FIG. 8.

In other embodiments, a push button may be provided for deactivating the previously programmed holiday light shut off time for the next upcoming holiday period only. Once pressed, the light will remain on for the duration of the holiday period. In some embodiments, an indicator light may be included to indicate that the holiday mode has been deactivated.

In other embodiments, a removable externally mounted wall unit that is wirelessly capable is provided as shown in FIG. 9. In some embodiments, this externally mounted unit has GPS and controlling functionality. In other embodiments, it does not have GPS and controlling functionality.

The apparatus described herein result in an independently operating light switch that completely eliminates the requirement to physically tape or cover light switches and eliminates the risk of accidental or intentional use of the light on a Jewish holiday. In addition, the apparatus incorporates methods for simplifying the application of energy saving and preference modes that if selected will greatly reduce energy usage and costs through the use of the on/off light timer and dimming overlay functionality applied during holiday mode.

In one aspect, the system described herein provides means for obtaining date, time and geographic location data and combining it with electronic and/or mechanical devices to enable the control system to operate the apparatus in accordance with Jewish law by utilizing the resulting religious reference times that are calculated from the sun and moons' relationship to the devise's specific geographic location. This method of operating light switches in accordance with Jewish law equally applies to other appliance, electronic or mechanical devices. Examples of such products include but are not limited to alarm clocks, wrist watches, a hot water control valves, refrigerators, stoves, dishwashers, plug wall outlets, external plugin wall timers, food warming hot plates, crockpots, door locks, electric hot water pots, motion detection home security lights, alarm systems, etc. However, this method of obtaining date, time and geographic location data and combining it with Jewish law has a dual application for many products that are not Jewish-specific as well, such as the timing of landscape watering systems, operation of video equipment, automatic door locking systems, pet food dispensing systems, etc.

Energy saving and preference modes as described herein in connection with certain embodiments utilize the geographic location, date and time to enable the automatic programming and control of systems based the sun and moon's relationship to a system, resulting in a significant reduction in management, energy usage and other associated costs. While the invention has been described in terms of specific embodiments, those skilled in the art will recognize that the invention can be practiced with modification within the spirit and scope of the claims.

What is claimed is:

1. A programmable lighting-control device for controlling building and/or household lighting, comprising:
a switch including a switch mechanism for controlling an electrical circuit to turn said lighting on and off; and
a control system including:
a memory for storing date data, time data, geographic location data, settings corresponding to a holiday mode and settings corresponding to a normal mode; and
a processor configured to alternate the lighting-control device between the normal mode and the holiday mode,
wherein in the normal mode the switch mechanism is operational to turn said lighting on and off in a normal light switching operation, and
wherein in the holiday mode the control system overrides the normal mode functionality of the switch mechanism, fixes the state of said lighting in its current on/off state, and maintains the state of said lighting in its current on/off state for the duration of the holiday mode regardless of a user's physical manipulation of the switch mechanism.

2. The device of claim 1, further comprising:
at least a first user input for commanding the processor to alternate between the normal mode and the holiday mode.

3. The device of claim 2, wherein the memory contains software capable of storing and determining Jewish events.

4. The device of claim 2, wherein the processor calculates an occurrence of a Jewish event by utilizing data relating to time, date, geographic location, and Jewish law.

5. The device of claim 4, wherein, once the occurrence of the Jewish event is calculated, the control system maintains and updates the data corresponding to the Jewish event automatically to fix the state of said lighting upon arrival and departure of each successive Jewish event.

6. The device of claim 4, further comprising:
at least a fourth user input for permitting a user to manually input the time, date and geographic location data.

7. The device of claim 4, wherein the control system further includes programmable energy saving and preference modes which utilize the calculated occurrence of a Jewish event to provide a user with a means of programming an automatically adjusting on/off light timer and dimming overlay functionality during the holiday mode.

8. The device of claim 4, further comprising:
a GPS enabled device for providing the date, time, and geographic location data.

9. The device of claim 8, wherein the GPS enabled device is powered through a power cord or an internal battery.

10. The device of claim 8, wherein the control system is configured to obtain GPS data from a handheld device separate from the lighting-control device through a wireless or direct plug-in connection to the lighting-control device.

11. The device of claim 4, wherein the processor is configured to determine the geographic location data from any one or more of a street address, a city, a county, a zip code, a state, a country, an area code, a longitude, a latitude, an elevation, a body of water, and a landmark.

12. The device of claim 4, further comprising:
a cell phone having tower triangulation software contained in a phone memory configured for generating tower triangulation data, wherein the processor of the control system is configured to determine the time, date, and geographic location data from the tower triangulation data.

13. The device of claim 2, wherein the holiday mode is further configured to automatically vary an amount of illumination from a first illumination setting to a second illumination setting and at least one time at which the adjustment of the amount of illumination occurs.

14. The device of claim 13, further comprising:
a third user input for permitting a user to input the adjustment of the amount of illumination, and a screen for displaying the time at which the adjustment of the amount of illumination occurs.

15. The device of claim 14, wherein the holiday mode is further configured to vary the amount of illumination from the first illumination setting to the second illumination setting over a pre-selected period of time.

16. The device of claim 15, wherein the holiday mode is further configured to vary the amount of illumination according to a linear function.

17. The device of claim 2, further comprising:
a slidable panel that exposes the first user input in a first position and that hides the first user input in a second position.

18. The device of claim 2, wherein the processor is pre-programmed to abort the holiday mode for a single Jewish event.

19. The device of claim 2, wherein the at least first user input comprises at least one activation push-button.

20. The device of claim 1, further comprising:
at least a second user input disposed on an externally mounted unit for initiating wireless communication of at least one Jewish event from the programmable-lighting control device to at least a first other programmable lighting-control device.

21. The device of claim 1, further comprising:
at least one user input mechanism for commanding the processor in an emergency to override the holiday mode and activate the normal mode.

22. A programmable electrical-control apparatus for controlling electrical current in an electrical circuit, comprising:
a switch including a switch mechanism for operating the circuit to apply electrical current to and remove electrical current from an electrically operated device other than a lighting device; and
a control system including:
a memory for storing date data, time data, geographic location data, settings corresponding to a holiday mode and settings corresponding to a normal mode; and
a processor configured to alternate the electrical-control apparatus between the normal mode and the holiday mode;
wherein in the normal mode the switch mechanism is operational to apply electrical current to and remove electrical current from the electrically operated device in a normal switching operation to turn the electrically operated device on and off, and
wherein in the holiday mode the control system overrides the normal mode functionality of the switch mechanism, fixes the state of the electrically operated device in its existing on/off state, and maintains the state of the electrically operated device in its existing on/off state for the duration of the holiday mode regardless of a user's physical manipulation of the switch mechanism.

23. The apparatus of claim 22, wherein the electrically operated device comprises at least one of a refrigerator, a stove, a dishwasher, a food warming plate, a crockpot, and an electric hot water pot.

24. The apparatus of claim 22, wherein the electrically operated device comprises at least one of an alarm clock, a wrist watch, a hot water control valve, a plug wall outlet, an external plugin timer, an electrical door locking system, a motion detection security system, and an alarm system.

25. The apparatus of claim 22, further comprising:
at least a first user input for commanding the processor to alternate between the normal mode and the holiday mode.

26. The apparatus of claim 22, wherein the memory contains software capable of storing and determining Jewish events.

27. The apparatus of claim 22, wherein the processor is pre-programmed to deactivate the holiday mode for a single Jewish event.

28. The apparatus of claim 22, wherein the processor calculates an occurrence of a Jewish event by utilizing data relating to time, date, geographic location, and Jewish law.

29. The apparatus of claim 28, wherein the processor is configured to determine the geographic location data from any one or more of a street address, a city, a county, a zip code, a state, a country, an area code, a longitude, a latitude, an elevation, a body of water, and a landmark.

30. The apparatus of claim 28, wherein, once the occurrence of the Jewish event is calculated, the control system maintains and updates the data corresponding to the Jewish event automatically to fix the state of the electrically operated device upon arrival and departure of each successive Jewish event.

31. The apparatus of claim 22, further comprising:
a GPS enabled device for providing the date, time, and geographic location data.

32. The apparatus of claim 31, wherein the control system is configured to obtain GPS data from a handheld device separate from the electrical-control apparatus through a wireless or direct plug-in connection to the electrical-control device.

33. The apparatus of claim 22, further comprising:
a cell phone having tower triangulation software contained in a phone memory configured for generating tower triangulation data, wherein the processor of the control system is configured to determine the time, date, and geographic location data from the tower triangulation data.

34. The apparatus of claim 22, further comprising:

at least a fourth user input for permitting a user to manually input the time, date and geographic location data.

35. A programmable electrical-control apparatus for controlling electrical current in an electrical circuit, comprising:
- a switch including a switch mechanism for operating the circuit to apply electrical current to and remove electrical current from an electrically operated device selected from the group consisting of a refrigerator, a stove, a dishwasher, a food warming plate, a crockpot, an electric hot water pot, an alarm clock, a wrist watch, a hot water control valve, a plug wall outlet, an external plugin timer, an electrical door locking system, a motion detection security system, and an alarm system; and
- a control system including:
- a memory for storing date data, time data, geographic location data, settings corresponding to a holiday mode and settings corresponding to a normal mode; and
- a processor configured to alternate the electrical-control apparatus between the normal mode and the holiday mode;
- wherein in the normal mode the switch mechanism is operational to apply electrical current to and remove electrical current from the electrically operated device in a normal switching operation to turn the electrically operated device on and off, and
- wherein in the holiday mode the control system overrides the normal mode functionality of the switch mechanism, fixes the state of the electrically operated device in its existing on/off state, and maintains the state of the electrically operated device in its existing on/off state for the duration of the holiday mode regardless of a user's physical manipulation of the switch mechanism.

* * * * *